July 26, 1949.                G. W. MARTIN                2,477,521
                            PROPELLER CLUTCH
                          Filed Nov. 16, 1945
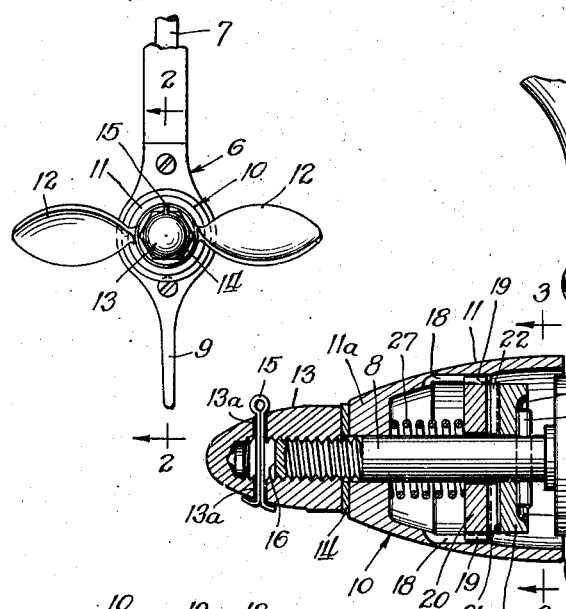
Inventor:
George W. Martin
By
Brown, Jackson, Boettcher & Dienner
Attys Patented July 26, 1949

2,477,521

UNITED STATES PATENT OFFICE 2,477,521

PROPELLER CLUTCH

George W. Martin, Eau Claire, Wis.

Application November 16, 1945, Serial No. 629,063

4 Claims. (Cl. 64—29)

This invention relates to boat propellers, and has to do with clutch means for establishing driving connection between the propeller and its associated shaft.

In propeller driven boats, including boats having inboard motors and boats having outboard motors, particularly when such boats are operated in shallow water or in water in which submerged objects may be present, there is the possibility that the propeller may strike a submerged object, causing damage to the propeller or to some portion of the driving mechanism, or to both. In order to reduce that risk, it is known to provide a shear pin at a suitable point in the propeller drive, of such character that if the propeller strikes an unyielding object the pin will shear before damage is caused to the propeller or the associated mechanism. In some cases a resilient cushion member is inserted in the propeller drive for the purpose of absorbing shock when the propeller strikes an unyielding object, to thereby further protect the propeller mechanism. Also, friction drive has been included in the propeller mechanism to allow slippage upon occurrence of abnormal resistance to rotation of the propeller. In certain of the mechanisms referred to, rubber is used as the cushioning material or in part of the friction drive and, in some cases, has proved to be highly efficient in general. The use of a friction drive incurs the risk that, if the parts are not properly adjusted, undesired slippage between the friction members may occur with resultant loss in driving efficiency and objectionable wear thereof. The use of rubber in propeller clutches of the character referred to is open to the objection that if the rubber is not protected by a metal cover it may, under adverse conditions, become vulcanized to the propeller hub, thus rendering the clutch inoperable for its intended purpose. Even where the rubber is properly protected by a metal covering, it may, after long use and under adverse conditions, deteriorate to such an extent as to render it difficult to maintain proper driving connection between the propeller shaft and the propeller under intended normal operating conditions.

My invention is directed to the provision of a propeller clutch which avoids the objections to the mechanisms above referred to, is compact, of simple and inexpensive construction, readily accessible for inspection, replacement, or repair, and provides positive driving connection between the propeller shaft and the propeller hub under normal operating conditions while assuring declutching of the propeller from the shaft responsive to abnormal resistance to rotation of the propeller. More specifically, I provide a propeller clutch in which necessity for using rubber or similar material is eliminated and the clutch members are formed of suitable metal and normally establish positive driving connection between the propeller shaft and the propeller, the clutch parts having interengaging cooperating clutch elements of a character to cause disengagement thereof automatically, effective for disabling the drive between the propeller shaft and the propeller, responsive to abnormal resistance to rotation of the propeller. Further, the clutch parts are of such character that, when disengaged for the purpose stated, they cooperate to produce an audible signal notifying the operator that abnormal resistance to rotation of the propeller has been encountered, so that the engine may be stopped until the cause of such condition has been investigated and remedied, thus reducing likelihood of injury to either the propeller or its associated operating mechanism. Further objects and advantages of my invention will appear from the detail description.

In the drawings:

Figure 1 is a stern view of a gear housing and propeller unit embodying the clutch of my invention, intended for use with an outboard motor;

Figure 2 is a sectional view of the propeller and the associated clutch means, taken substantially on line 2—2 of Figure 1, on an enlarged scale, with certain parts shown in elevation and the gear housing shown in side view;

Figure 3 is a sectional view taken substantially on line 3—3 of Figure 2;

Figure 4 is an outer face view of the inner clutch member; and

Figure 5 is a side view of the inner clutch member.

I have shown the propeller clutch means of my invention, by way of example, as applied to a unit intended for use with an outboard motor. This unit comprises a gear housing 6, of suitable construction, carried at the lower end of a steering tube or column having at its upper end a suitable motor, as is known. The motor drives a shaft 7 extending downward into casing or housing 6 and having driving connection, through gearing therein to a propeller shaft 8 rotatably mounted within housing 6 and extending outward therebeyond. My propeller clutch means, hereinafter described, is shown mounted on the propeller shaft 8, inside the propeller hub. It can be used with any propeller without regard to whether the driving motor is of inboard or outboard type.

Housing 6 is provided with the usual downwardly extending skeg 9.

A propeller 10, comprising a hub 11 and suitably formed and disposed blades 12 secured to the hub, conveniently formed integrally therewith, is mounted on the after portion of propeller shaft 8. The propeller 10 is restrained against movement lengthwise of shaft 8 aft by a cap nut 13 screwing on the after end of shaft 8 in contact with a washer 14 abutting the after end of hub 11, nut 13 being normally restrained against turning movement on shaft 8 by a cotter pin 15 passing through a diametrical slot 16 in shaft 8 and through diametrically opposite bores 13a in nut 13. Any other suitable means may be provided, within the field of my invention, for restraining nut 13 against turning movement relative to shaft 8.

The hub 11 of propeller 10 is of hollow construction for the major portion of its length, open at its forward end, and is provided at its thickened outer or after end portion 11a with an axial bore of a diameter to receive shaft 8 snugly but not tightly.

Propeller hub 11 is provided interiorly thereof with a plurality, for example four, of forwardly opening grooves 18 arranged radially and extending lengthwise thereof. The grooves 18 receive corresponding bosses or tongues 19 formed integrally with and projecting radially outward from an after disc-shaped clutch member 20 loose on shaft 8 and disposed within the body of hub 11. The member 20 is provided at its forward end or face with a plurality of radially disposed clutch elevents in the form of teeth 21. The teeth 21 normally interengage with similar teeth or clutch elements 22 at the after end or face of a forward clutch member 23 disposed about shaft 8. The clutch member 23 is provided, in its forward face, with aligned radially extending grooves 24 which receive the end portions of a shear pin 25 extending through shaft 8 diametrically thereof. A coil compression spring 27 is disposed about propeller shaft 8 and is confined between the after end wall 11a of hub 11 and the after clutch member 20, normally effective for holding this member in clutching engagement with the forward clutch member 23, the latter being restrained against forward movement lengthwise of shaft 8 by shear pin 25 which, as noted, engages in grooves 24 of member 23 and establishes positive driving connection between this member and shaft 8.

From what has been said, it will be seen that so long as the members 20 and 23 are held in clutching engagement, the propeller hub 11 has positive driving connection to the propeller shaft 8 so that no slippage between parts occurs and the propeller is driven at the same speed as the propeller shaft. Referring particularly to Figure 5, the teeth 22 of the forward clutch member 23 taper forward axially thereof. The amount or rate of taper of teeth 22 may vary considerably, though I have found that for use with ordinary two-cylinder outboard motors a taper such that the side surfaces of teeth 22, at the circumference of member 23, are inclined at an angle of approximately 30° to the horizontal is highly efficient and suitable for most conditions encountered in practice. As will be readily understood, the teeth 21 of the after clutch member 20 are complementary to teeth 22 of the forward clutch member 23 and are tapered similarly but oppositely to the latter teeth. The nut 13 provides means whereby the propeller may readily be adjusted on shaft 8 in proper relation to the gear housing 6, the necessary movement of the propeller lengthwise of shaft 8 for that purpose being rather slight. The rate or strength of spring 27 is such that the adjustment of the propeller has practically no effect with respect to the force exerted by this spring for holding clutch member 20 in clutching engagement wtih clutch member 23. Under normal conditions the propeller is clutched to and positively driven by the propeller shaft 8, but if abnormal resistance is offered to rotation of the propeller, as when the propeller strikes an obstacle which produces an objectionable overload, the propeller will be automatically declutched from the shaft 8, as will be explained more fully presently.

The teeth of the clutch members 20 and 23 are oppositely tapered, as noted, and when objectionably high resistance is offered to rotation of the propeller the contacting side surfaces of the teeth of the clutch members create a component of force which tends to force these members apart. It will be apparent that the angle of inclination of the teeth of the clutch members, and the force exerted by spring 27 on the clutch member 20, which force is substantially constant, as noted, determine the load at which the clutch members 20 and 23 will become disengaged so as to declutch the propeller from the shaft 8. The teeth of the clutch members 20 and 23 thus constitute clutch elements normally engaged and establishing positive driving connection between the members 20 and 23, such elements being disposed and adapted to cause declutching of the members 20 and 23 so as to declutch the propeller from shaft 8, responsive to the propeller encountering objectionably high resistance to its rotation. When the propeller encounters such abnormal or objectionably high resistance to its rotation—for example, when a propeller blade strikes a submerged object—the clutch member 20 is displaced aft from clutch member 23, as permitted by the elongated grooves 18 in hub 11 and in opposition to spring 27, thus declutching the propeller hub from shaft 8. When that occurs, the clutch member 23 continues to rotate with shaft 8, and the teeth thereof striking or clashing the teeth of member 20 produce an audible signal serving to warn the operator or occupant of the boat that the propeller has encountered an obstruction preventing its rotation. When that occurs, the operator can quickly stop the engine and then investigate, removing the obstruction or moving the boat into position in which the propeller clears the obstruction, the members 20 and 23 being then automatically clutched together, after which the boat may proceed on its way.

It will be clear from the above that the propeller clutch of my invention does not necessitate the use of rubber or like material which, under adverse conditions, may tend to become vulcanized to associated metal parts. All of the parts of the clutch of my invention are formed of suitable metal and may readily be formed by die casting, which is advantageous as avoiding necessity of machining and is conducive to low cost of production. The amount of overload at which the clutch operates, being determined by the angle of the teeth and the strength of the spring, is not adjustable. Consequently, it cannot be improperly adjusted by a user. The angle and the spring strength can be properly combined by the manufacturer to insure protection of the motor. The shear pin is added insurance against damage to the driving parts. The clutch means is, as a whole, of comparatively simple construction and may readily be disassembled for replacement or repair of parts, and as readily reassembled, which is of practical importance in devices of this character.

It will be understood that changes in construction and arrangement of parts of the clutch means of my invention may be resorted to without departing from the field and scope thereof, and I intend to include all such variations, as fall within the scope of the appended claims, in this application in which the preferred form only of my invention has been disclosed.

I claim:

1. In propeller clutch means of the character described, a propeller shaft and a propeller thereon restrained against movement in one direction lengthwise of said shaft, two cooperating clutch members loose on said shaft, one having tongue and groove driving connection to said propeller and the other having positive driving connection to said shaft and being restrained against movement lengthwise thereof in a direction away from said one member, the latter being movable relative to said propeller lengthwise of said shaft in a direction away from said other member, and yielding means normally holding said one member in engagement with said other member, said clutch members having interengaging clutch elements normally establishing positive driving connection therebetween disposed and adapted to cause movement of said one member away from said other member into position disconnecting the driving connection therebetween responsive to abnormal resistance to rotation of said propeller, the latter being otherwise free from said shaft with respect to rotation thereof.

2. In propeller clutch means of the character described, a propeller shaft and a propeller thereon comprising a hub restrained against aftward movement lengthwise of said shaft, an aftward clutch member loose on said shaft having tongue and groove connection to said hub, a forward clutch member loose on said shaft having positive driving connection thereto and restrained against inward movement lengthwise thereof, and yielding means urging said hub aftward and said after clutch member forward along said shaft, said clutch members having interengaging clutch elements normally establishing positive driving connection therebetween disposed and adapted to cause aftward movement of said after member into position disconnecting the driving connection between said clutch members responsive to abnormal resistance to rotation of said propeller, said propeller hub being otherwise free from said shaft.

3. In propeller clutch means of the character described, a propeller shaft and a propeller thereon comprising a hub restrained against aftward movement lengthwise of said shaft, an after clutch member loose on said shaft having tongue and groove connection to said hub provided with forwardly directed clutch teeth, a forward clutch member loose on said shaft having positive driving connection thereto and restrained against forward movement lengthwise thereof, said forward member having aftwardly directed clutch teeth disposed and adapted for interengagement with the teeth of said after member effective for establishing positive driving connection therebetween, and yielding means urging said after clutch member forward effective for maintaining it normally engaged with said forward clutch member, the teeth of said clutch members being tapered axially thereof in opposite relation effective to cause aftward movement of said after member into position disconnecting the driving connection between said clutch members responsive to abnormal resistance to rotation of said propeller, said propeller hub being otherwise free from said shaft.

4. In propeller clutch means of the character described, a propeller shaft and a propeller thereon comprising a hub restrained against aftward movement lengthwise of said shaft, an after clutch member loose on said shaft having tongue and groove connection to said hub provided at its forward face with radially disposed inwardly directed clutch teeth, a forward clutch member loose on said shaft having positive driving connection thereto restrained against forward movement lengthwise thereof, said forward member having at its after face radially disposed aftwardly directed clutch teeth adapted for interengagement with the clutch teeth of said after member effective for establishing positive driving connection therebetween, and yielding means urging said after clutch member forward effective for maintaining it normally engaged with said forward clutch member, the teeth of said clutch members being tapered axially thereof in opposite relation effective to cause aftward movement of said after member into position disconnecting the driving connection between said clutch members responsive to abnormal resistance to rotation of said propeller, said propeller hub being otherwise free from said shaft.

GEORGE W. MARTIN.

REFERENCES CITED

The following references are of record in the file of this patent:

UNITED STATES PATENTS

| Number | Name | Date |
| --- | --- | --- |
| 1,860,750 | Riggs | May 31, 1932 |
| 1,864,716 | Doremus | June 28, 1932 |
| 1,999,523 | Willoughby | Apr. 30, 1935 |
| 2,164,485 | Yantis | July 4, 1939 |